United States Patent Office 3,436,200
Patented Apr. 1, 1969

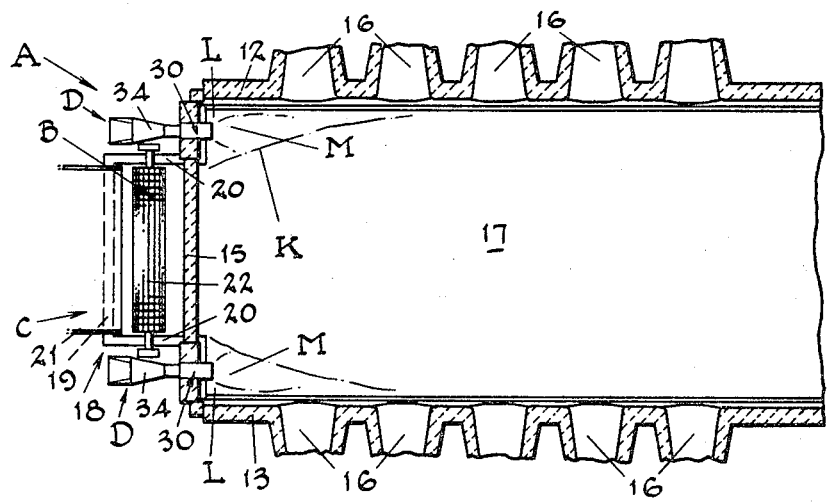
Fig. 1.
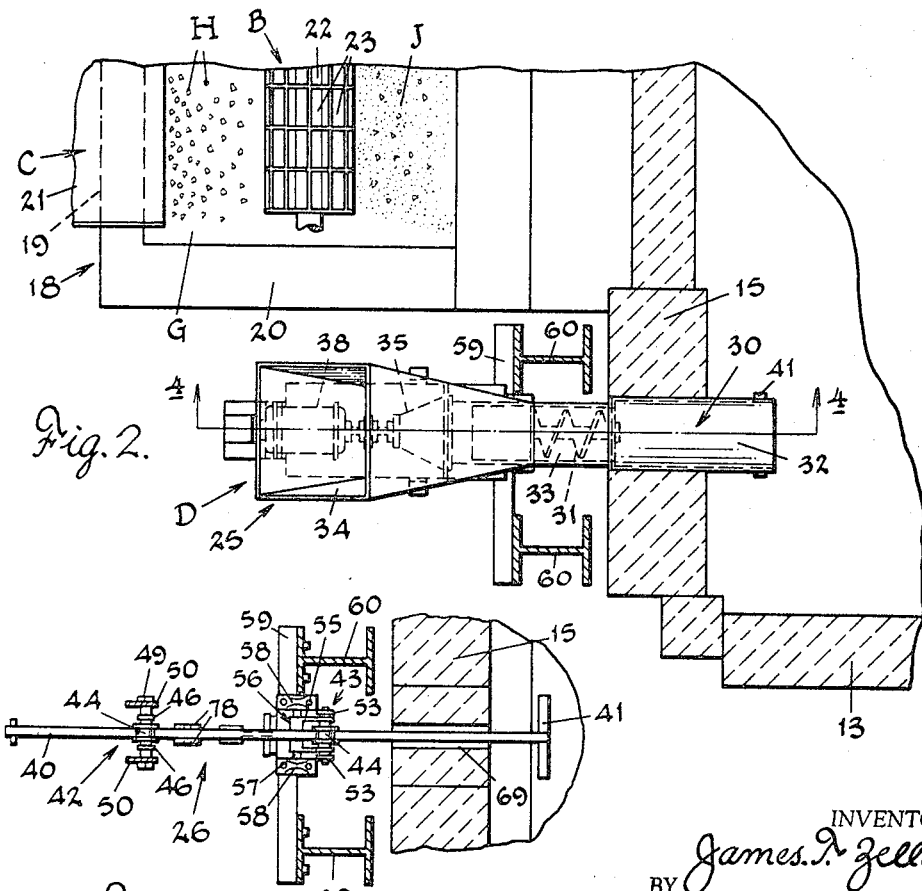
Fig. 2.
Fig. 5.
INVENTOR.
James T. Zellers, Jr.
BY
Hobbe & Swope
ATTORNEYS

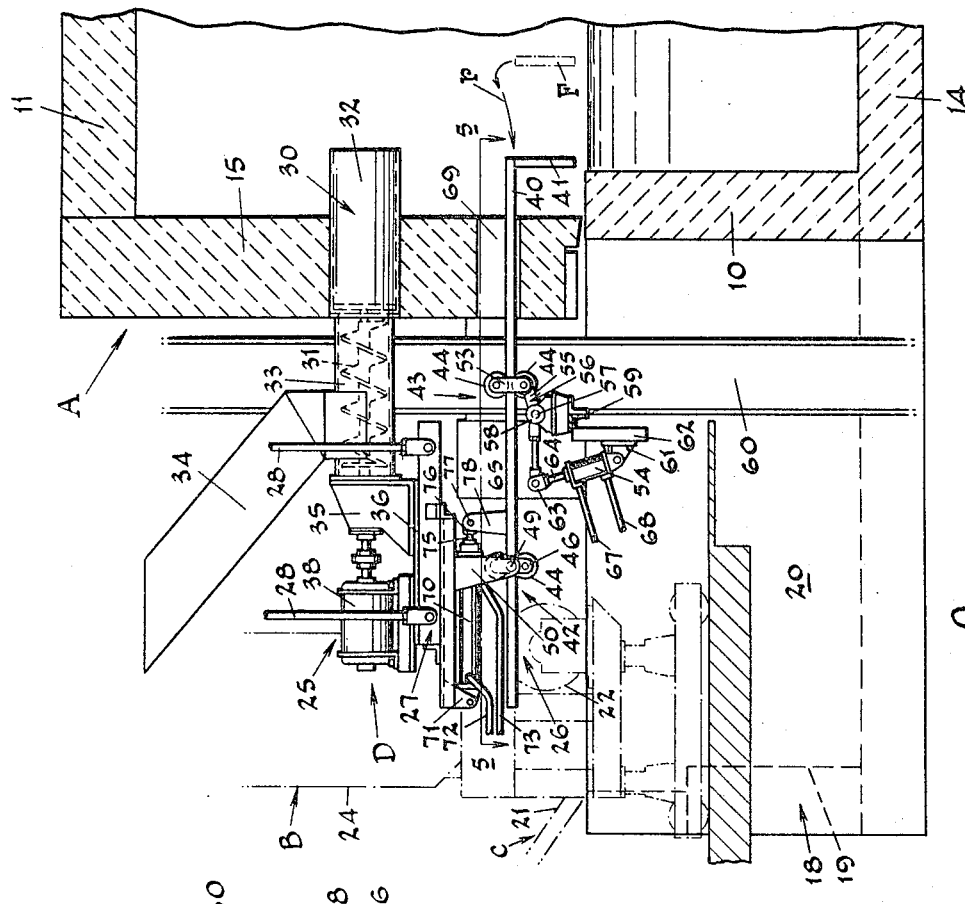

3,436,200
METHOD OF FEEDING GLASS BATCH MATERIAL
James T. Zellers, Jr., Charleston, W. Va., assignor to Libby-Owens-Ford Company, a corporation of Ohio
Filed Apr. 22, 1965, Ser. No. 449,951
Int. Cl. C03b *3/00, 5/00*
U.S. Cl. 65—17                              3 Claims

ABSTRACT OF THE DISCLOSURE

Supplying glass-making materials to a tank-furnace containing a mass of molten glass by depositing a continuous layer of raw batch materials on the molten glass in a charging area of reduced width extending outwardly from the melting zone thereof and advancing the layer into the melting zone, and depositing glass cullet on the molten glass in the corners of the melting zone outwardly beyond the edges of the advancing layer of batch materials.

---

The present invention relates broadly to the art of glass-making and more particularly is concerned with an improved method of and apparatus for feeding glass-making materials into a glass-melting tank-furnace.

It is a principal object of this invention to provide an improved method of and apparatus for feeding glass-making materials into the charging end of a tank-furnace in a predetermined and novel pattern.

Another object is to provide an improved method for selectively increasing the output of a glass-making tank-furnace by feeding additional amounts of scrap or cullet glass onto the molten mass in areas of the charging end of the furnace that are not covered by the glass-making materials.

Another object is the provision of a method of the above character in which supplementary amounts of cullet glass are fed into areas of the furnace disposed on opposite sides of the layer of glass-making materials entering the central melting zone of the furnace.

A further object of the invention is to provide apparatus by which the method of this invention is carried into effect, said apparatus being located in areas of the furnace substantially equally spaced from the usual doghouse or charging area to feed scrap or cullet glass into corner areas of the melting zone into which the normally fed quantities of glass-making materials are not distributed.

Other objects and advantages of the invention will become more apparent during the course of the following description when read in connection with the accompanying drawings.

In the drawings, wherein like numerals are employed to designate like parts throughout the same:

FIG. 1 is a plan view of a glass-melting tank-furnace and batch feeding apparatus constructed in accordance with the invention;

FIG. 2 is a fragmentary enlarged view of a part of the apparatus of FIG. 1;

FIG. 3 is a fragmentary end view of one of the cullet feeding apparatus;

FIG. 4 is a longitudinal vertical section taken on line 4—4 of FIG. 2; and

FIG. 5 is a horizontal section taken on line 5—5 of FIG. 4.

Generally stated, the complete batch or mixture of materials usually supplied to glass-making furnaces consists of raw pulverulent materials, sometimes known as raw batch, and a proportionate quantity of broken or scrap glass, known as cullet. According to one manner of supplying these materials, the complete batch (raw batch and cullet) is fed substantially continuously as a blanket-like layer onto the pool of molten glass in the doghouse or charging area of the furnace. As refined molten glass is withdrawn from the opposite or outlet end of the furnace, the resultant current of flow causes the finely divided glass-making materials to move into the initial melting zone of the furnace to spread evenly over the surface of the molten glass and readily blend therewith as they melt. However, since the doghouse or charging area of the furnace extends less than the entire width of the inlet end of the initial melting zone of the furnace the corner areas of the molten mass are not covered by the finely divided glass-making materials.

This invention improves the general output of a glass-melting furnace by supplementing the amount of cullet glass supplied and feeding the same onto the surface of the molten mass in areas of the melting zone which are not covered by the blanket-like layer of materials.

Referring more particularly to the drawings, there is shown in FIG. 1, a schematic plan view of a glass-melting tank-furnace, generally designated by the letter A, and having associated therewith a raw batch material feeding apparatus, indicated at B, a cullet feeding apparatus C and supplemental cullet feeding apparatus D.

The tank-furnace A, as also illustrated in FIGS. 2 and 4, has a lower end wall 10, an upper end breast wall 15, a cap arch or roof 11, breast or side walls 12 and 13 and a floor or bottom 14. The side walls 12 and 13 are equipped with conventionally arranged and transversely aligned ports 16; said ports being connected in the usual manner to regenerator chambers (not shown) and adapted to fire and exhaust alternately from opposite sides of the furnace in a manner to reduce the batch material in the melting zone 17 to a molten consistency. In the construction of some typical tank-furnaces, such as herein disclosed, to which the batch materials are fed in the nature of a combined blanket-like layer, the doghouse or charging area 18 has a width which is at least half the width of the furnace between the side walls 12 and 13. This doghouse area is thus structurally defined by an end wall 19, integral, spaced side walls 20; the bottom or floor of the area being a continuation of the furnace bottom 14.

Generally speaking the cullet feeding apparatus C is adapted to discharge scarp or cullet glass into the pool of moltent glass G in an area adjacent the end wall 19 of the doghouse 18 in such a manner as to create a substantially continuously formed layer H thereon.

As is believed to be well-known in the making of sheet or plate glass, one type of cullet feeding apparatus includes an inclined pan 21 located over the doghouse end wall 19 and supplied with scrap or broken particles of glass from an overhead source. As this cullet layer H is carried forwardly, there is deposited on the surface thereof a substantially continuous layer J of the raw batch pulverulent materials from the feeding apparatus B.

As is also known, the laying down of a blanket-like layer of raw batch materials is accomplished by a rotatably driven so-called "vane wheel," as indicated at 22 in FIG. 2, which is equipped with a plurality of compartments 23 that are substantially filled with the batch materials as they pass beneath the open end of a supply hopper indicated at 24 in FIG. 4 in the broken line illustration of feeding apparatus B.

The characteristic flow of molten glass from the doghouse or charging area into and through the melting zone is commonly known to be slower and more sluggish along the relatively cooler side wall areas than in the hotter middle area and this lends itself advantageously to the method of this invention since it utilizes the reduced rate of flow to more evenly distribute the blanket-like layer K across the central area and to spread out as the layer is reduced in thickness as the movement thereof carries it forwardly into the highly heated temperature of flames emanating from the firing ports. As seen in FIG. 1, the spreading out and forward progress of the layer K does not result in the entry of any portion of the layer into corner areas L defined by the end wall 10 and side walls 12 and 13 of the furnace. Consequently, there has been found additional space within which components of the batch materials, such as cullet glass indicated at M, can be advantageously supplied to augment or increase the total amount of glass-making materials supplied to the furnace. This is believed and has been found to be possible on a practical basis since the reduction of the cullet to molten consistency does not require the same high degree of heat as the raw batch materials directed into the more central area of the furnace.

To this end, supplemental cullet feeding apparatus D are arranged in the corner areas of the end breast wall 15, adjacent the side walls 12 and 13. As viewed in FIG. 4, each apparatus D includes a cullet feeding device, generally designated by the numeral 25, and a pusher device or member similarly indicated at 26; both being supported on a platform 27 carried by hanger rods 28 adjustably suspended from the structural framework of the furnace.

More particularly, the feeding device 25 is provided with a casing 30 within which is mounted an auger or screw-type impeller 31. The casing 30 comprises a tubular or barrel portion 32, inserted through the end breast wall 15 and opening into the melting zone 17 in suitable upwardly spaced relation to the surface of the molten glass, and an outwardly disposed supply portion 33. The supply portion 33 is provided with a closed hopper 34 connected at its upper open end to a source of cullet supply (not shown). The casing 30 is attached to a gear unit 35 mounted by a base 36 on the platform 27; said platform 27 also mounting the drive motor 38 connected to the unit 35 for driving the impeller or conveyor 31. As the cullet particles are discharged from the barrel 32, accumulations thereof are periodically moved forward by the pusher member or device 26.

This device 26 includes a rod 40 to one or the inner end of which is attached a blade 41. The rod 40 is supported for axial reciprocatory motion along a substantially horizontal path by means of pairs 42 and 43 of opposed rollers 44. The rollers of pair 42 are journaled by their axles between plates 46 that are medially supported by a bolt 49 on legs 50 depending from a bracket 51 of the framework 27.

The rollers of pair 43 are journaled by their associated axles between plates 53 and are adapted to be raised and lowered in a vertical plane by means of a cylinder 54. To this end, the plates 53 are carried at one end 55 of a bell-crank lever 56 which is supported by shaft 57 journaled in bearings 58 mounted on a frame 59 carried by the buck-stays 60 of the furnace framework. The cylinder 54 is swingably supported at its head end on a bracket 61 attached to the frame 59 by a plate 62. The piston rod 64 of cylinder 54 is pivotally attached to the end 65 of bell-crank lever 56 through clevis 63 whereby the lever will be rocked about the axes of shaft 57 upon application of pressure to the cylinder 54 through pipes 67 and 68.

The rod 40 is adapted to be reciprocally moved through slotted opening 69 in wall 15 and in its supported position between the pairs of rollers 42 and 43 by means of a cylinder 70 swingably carried at its head end by the bracket elements 71 and connected to a source of controlled pressure by pipes 72 and 73. The piston rod 75 of cylinder 70 is equipped with a clevis 76 which by pin 77 is connected to a pair of upwardly directed arms 78 carried by the rod 40.

In actual use, the cullet glass is urged forwardly from the exit end of the hopper 34 into the barrel 32 from the open end of which the cullet particles are discharged onto the surface of the molten glass. At suitably spaced intervals of time, the cylinder 70 is supplied with pressure through pipe 72 to move the rod 40 and blade 41 forward from the full line position of FIG. 4 to an approximate position F indicated in broken line. The actual distance traversed by the blade 41 is, of course, determined by the effective working stroke of the cylinder 70 and is accomplished by the connection of the piston rod 75 to arms 78 attached to the rod 40. This forward motion of the blade 41 serves to advance the accumulating pile or lump-like mass of cullet into the melting zone of the furnace where it merges with the blanket-like layer of batch material and cullet flowing from the doghouse as previously described.

Through the use of conventional electric and fluid control devices, forward motion of the pusher device 26, i.e., the rod 40 and blade 41, is halted and the direction of pressure is reversed from the pipe 72 to pipe 73. This pipe being connected to the rod end of cylinder 70 initiates return movement of the rod 40 and simultaneous retraction of the blade 41 to its rest (full line) position. In timed relation to the reversal of pressure to cylinder 70, pressure is directed through pipe 67 to the rod end of cylinder 54 to bring about inward motion of piston rod 64 and resulting in upward movement of end 55 of bell-crank 56 as the bell-crank is swung about the axis of shaft 57. This action is reflected in upwardly directed motion of the pair 43 of rollers 44. Consequently, as the rod 40 is moved rearwardly, it will be swung upwardly at the same time with the related pivoting of the pair 42 of rollers 44 and plates 46 about the axis of bolt 49. This action will lift the blade 41 so that it is raised from the cullet while being caused to move rearwardly with the rod. Such movement of the blade could be assumed to follow a path substantially shown by the arrow designated by the letter $r$. Upon the reversal of pressure to the cylinder 54, such as through pipe 68, the rod will be swung downwardly to the substantially horizontal plane of its rest position.

The operation of the feeding apparatus can readily be understood from the above description. Cullet is deposited on the surface of the molten glass G in the charging area from the cullet supply via the pan 21. A layer of raw batch material is deposited on the cullet layer from the vane wheel 22 and the superposed layers are fed into the melting zone of the tank-furnace. At the same time supplemental cullet is supplied to the molten glass surface in the corner areas L of the tank-furnace through the separate feed apparatus D located between the respective side walls of the furnace and sides of the charging area. This supplemental cullet is periodically moved away from the end wall of the tank-furnace by utilizing pusher devices 26.

According to the disclosed novel features of this invention, it is possible to increase the tonnage output of high quality molten glass by utilizing surface space of the molten glass in the melting zone of the tank-furnace which had previously been uncovered.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

1. A method of feeding finely divided glass-making materials into a melting furnace having a mass of molten glass and having an inlet end and a melting zone adjacent said inlet end which comprises, depositing raw glass-making materials on the molten glass at the inlet end of said furnace, simultaneously depositing glass cullet on opposite sides of said raw glass-making materials, and periodically advancing said glass cullet on opposite sides of said raw glass-making materials away from said inlet end.

2. In a method of supplying glass-making materials to the melting end of a glass tank-furnace containing a mass of molten glass and in which raw glass-making materials are fed to and moved forwardly on said mass in a pattern that leaves corner areas of said mass uncovered, the step of feeding cullet onto said mass at said corner areas.

3. In a method of feeding glass-making materials to a glass tank-furnace containing a body of molten glass and having a charging area of reduced width extending outwardly from a melting area thereof, wherein a continuous layer of raw glass-making materials is deposited onto the surface of the molten glass in said charging area and advanced into said melting area, the improvement comprising depositing cullet on the surface of the molten glass within said melting area outwardly beyond the margins of said layer of glass-making materials.

References Cited

UNITED STATES PATENTS

| | | | |
|---|---|---|---|
| 1,906,695 | 5/1933 | Lufkin | 65—347 |
| 1,916,262 | 7/1933 | Good | 65—17 |
| 3,193,119 | 7/1965 | Blaine | 65—335 |
| 3,294,506 | 12/1966 | Blaine | 65—27 |

DONALL H. SYLVESTER, *Primary Examiner.*

E. R. FREEDMAN, *Assistant Examiner.*

U.S. Cl. X.R.

65—135, 335